Figures 1, 2:
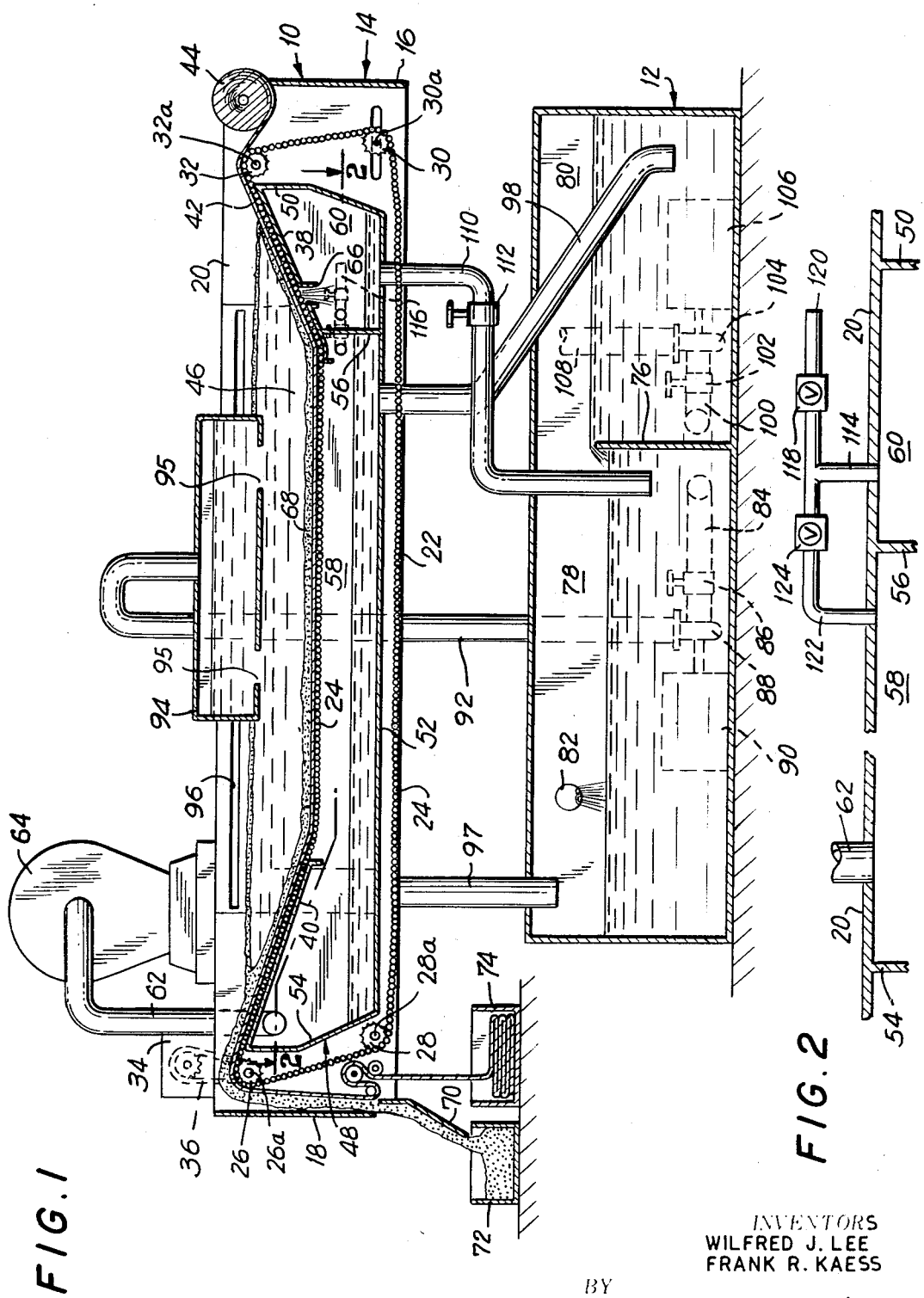

United States Patent

Lee et al.

[15] 3,690,466
[45] Sept. 12, 1972

[54] FILTER

[72] Inventors: Wilfred J. Lee, East Syracuse; Frank R. Kaess, Oneida, both of N.Y.

[73] Assignee: Clarkson Industries, Inc., New York, N.Y.

[22] Filed: Nov. 18, 1970

[21] Appl. No.: 90,666

[52] U.S. Cl. .................................210/387, 210/406
[51] Int. Cl. ...........................................B01d 29/04
[58] Field of Search................:........................210/387, 406

[56] References Cited

UNITED STATES PATENTS

| | | |
|---|---|---|
| 3,559,807 | 2/1971 | Reilly.....................210/387 X |
| 3,347,378 | 10/1967 | Arnold et al...........210/387 X |
| 3,333,705 | 8/1967 | Lee.........................210/387 X |
| 3,409,139 | 11/1968 | Jackson et al. ........210/406 X |

FOREIGN PATENTS OR APPLICATIONS

| | | |
|---|---|---|
| 1,316,395 | 12/1962 | France......................210/387 |

Primary Examiner—John Adee
Attorney—Curtis, Morris & Safford

[57] ABSTRACT

A flat bed filter in which a filter medium in strip form is supported on an endless conveyor and supports a pool of contaminated liquid to be filtered. The conveyor is periodically advanced to provide fresh filter medium for filtering the contaminated liquid. The underside of the conveyor communicates with an evacuated compartment which is separated into separate chambers by a transverse partition. The transverse partition is in sealing engagement with the underside of the conveyor that advances the filter medium, and a means is provided for maintaining the chamber nearest the supply of filter medium at a higher pressure than the adjacent chamber in order to reduce the flow rate of contaminated liquid through the portion of filter medium initially exposed to the pool of liquid to be filtered.

6 Claims, 2 Drawing Figures

PATENTED SEP 12 1972

3,690,466

INVENTORS
WILFRED J. LEE
FRANK R. KAESS

BY Curtis, Morris & Safford
ATTORNEYS

FILTER

The present invention relates to filters and more particularly to a flat bed filter which incorporates apparatus for reducing the amount of contaminated liquid that initially flows through the fresh filter medium and thereby reduces the amount of such contaminated liquid that must be recirculated for further filtration. The invention is especially useful in connection with the filtration of machine tool coolants and will be illustratively described in relation to this application. However, as the description proceeds, it will be apparent that the apparatus of the invention can also be used for filtering other types of contaminated liquids.

Conventional flat bed filters commonly comprise a liquid permeable, endless conveyor, such as an interlocking wire mesh belt, which is driven intermittently in a fixed path around an evacuated compartment in which filtered liquid is collected. A sheet of filter medium, such as porous paper or cloth, is fed onto the upper side of the conveyor for movement therewith and the conveyor is so guided as to form a pool of liquid to be filtered on the top of the filter medium.

Contaminated liquid, e.g., a machine tool cutting fluid or coolant, is fed continuously to the pool of liquid, and filtrate is continuously removed from the evacuated compartment. As filtration proceeds, a cake is built up on the filter medium and the resultant increase in pressure drop across the filter cake and medium causes the pressure within the evacuated compartment to decrease. The evacuated compartment is provided with a pressure-responsive switch which when the pressure drops below a predetermined value actuates a driving mechanism to cause the conveyor to move a section of fresh filter medium into the pool of liquid. The consequent increase in pressure within the evacuated compartment actuates the pressure-responsive switch to cause the conveyor to be stopped when a predetermined amount of fresh filter medium has been advanced into the pool.

Since the fresh filter medium entering the pool has no filter cake thereon, the filtration rate therethrough is relatively high and accordingly a certain amount of the contaminant passes through this portion of the filter medium. Since this incompletely filtered liquid cannot be directly returned to the work area, it is customary to provide a separate section of the evacuated compartment for collecting the incompletely filtered liquid so that it can be recycled for further filtration.

Filters of the type described above are subject to the disadvantage that in many cases, especially where the evacuated compartment is operated at a relatively high vacuum, an excessively high flow rate of liquid through the fresh filter medium into the recirculation section of the evacuated compartment is obtained until such time as the fresh filter medium becomes coated with a filter cake that reduces the flow rate therethrough. The initial flow rate of incompletely filtered liquid that must be circulated is often so high as to seriously impair the capacity of the filter. Thus this high rate of recirculation is undesirable and contributes to an inefficient performance of the filtration unit.

It is accordingly an object of the present invention to provide a flat bed filter wherein the volume of incompletely filtered liquid that must be recycled is substantially reduced. It is another object of the invention to provide a flat bed filter which includes means for reducing the flow rate of contaminated liquid through the fresh filter medium at the end of the pool of liquid to be filtered at which the filter medium enters the pool. It is a further object of the invention to provide means for selectively adjusting the flow rate of incompletely filtered liquid through the fresh filter medium in relation to the overall filtration rate. It is still another object of the invention to provide means for establishing a desired pre-coat of filter cake on the fresh filter medium while minimizing the amount of contaminated liquid that flows therethrough. Other objects of the invention will be in part obvious and in part pointed out hereafter.

The objects and advantages of the invention may be achieved, in general, by providing in a filter of the general type described above a separate recirculation chamber communicating with the portion of the conveyor that supports the fresh filter medium and effectively sealed from the main vacuum chamber of the filter. This separate chamber has selectively adjustable means associated therewith for varying the pressure therein independently of the pressure in the main vacuum chamber. The construction is such that a pressure can be maintained in the recirculation chamber which, although it may be at atmospheric pressure or below atmospheric pressure, is substantially higher than the pressure in the main vacuum chamber. Thus the pressure drop through the fresh filter medium at the end of the pool of contaminated liquid where the filter medium enters the pool is reduced and flow of contaminated liquid therethrough is consequently decreased.

In order to point out more fully the nature of the present invention, reference will now be made to the accompanying drawings which illustrate apparatus incorporating a preferred embodiment of the invention. It is to be expressly understood, however, that the description of this preferred embodiment is intended to be for purposes of illustration only and not to define the limits of the invention, reference being had for this purpose to the appended claims:

In the drawings:

FIG. 1 is a semi-diagrammatic side view of a flat bed filter, largely in section and showing the general arrangement of conveyor, filter medium, main vacuum chamber and recirculation chamber; and FIG. 2 is an enlarged partial horizontal section taken on the line 2—2 of FIG. 1 and showing mean for maintaining independent pressures in the recirculation chamber and the main vacuum chamber.

Referring now to the drawings and particularly to FIG. 1, the apparatus there shown comprises the filter proper generally designated by the numeral 10 and beneath the filter a liquid accumulator tank generally designated by the numeral 12. The filter 10 comprises a tank 14 having end walls 16 and 18, side walls 20 (only one of which is shown) and bottom 22. Within tank 14 there is a fluid permeable, endless conveyor 24 mounted on four pairs of sprockets 26, 28, 30 and 32, only one sprocket of each pair being shown in the drawing. The sprockets are secured to shafts 26a, 28a, 30a and 32a which in turn are rotatably mounted in the side walls 20 of tank 14. The conveyor is driven through shaft 26a by a motor 34 and chain drive 36 and is periodically advanced counterclockwise in a manner more fully described hereafter.

The right-hand end of the upper course of conveyor 24 is supported by a downwardly sloping guide plate 38 and the left-hand end of the upper course of the conveyor is supported by an upwardly sloping guide plate 40. The upper course of conveyor 24 in turn supports a strip of filter medium 42, which may be, for example, paper or cloth, and which is supplied to the conveyor from a roll 44 rotatably mounted at the right-hand end of tank 14. The upper course of conveyor 24 and the portion of filter medium 42 supported thereon cooperate with tank sides 20 to define a shallow depression adapted to contain a pool 46 of the liquid to be filtered, e.g., a machine tool coolant. Conventional liquid sealing means (not shown) are provided at the sides of the tank to prevent the liquid of pool 46 from by-passing the filter medium 42.

Located within the conveyor 24 there is a vacuum compartment 48 which is defined by guide plate 38, right end wall 50, bottom wall 52, left end wall 54, guide plate 40 and the adjacent portions of side walls 20 of tank 14. The compartment 48 is divided by a vertical transverse partition 56 into a main vacuum chamber 58 and recirculating chamber 60. The partition 56 effectively provides a seal between the chambers 58 and 60 to permit a pressure difference to be established between the two chambers as more fully described below. Connected to the upper left-hand portion of chamber 58 there is a conduit 62 leading to a vacuum pump 64 by means of which the chamber is evacuated.

The portion of conveyor 24 between the ends of guide plates 38 and 40 is exposed to the interior of chamber 58, and thus the reduced pressure in chamber 58 tends to promote the flow of coolant through the filter medium and conveyor, and filtered coolant accumulates in chamber 58. In like manner, guide plate 38 is provided with a transverse slot 66 through which filtered coolant can flow into chamber 60.

As pointed out above, the conveyor 24 is periodically advanced counterclockwise to bring fresh filter medium into contact with the coolant at the right-hand end of the pool 46 and to remove spent filter medium from the left-hand end of the pool. This periodic movement is initiated and stopped by a switch (not shown) which is responsive to the pressure in chamber 58 and controls the operation of motor 34. As the filtration operation proceeds, a filter cake 68 is built up on filter medium 42, thereby increasing the pressure drop between pool 46 and the interior of chamber 58. Then the pressure in chamber 58 reaches a predetermined relatively low value, the pressure-responsive switch is activated to start motor 34. As fresh filter medium is carried into the right-hand end of pool 46, the pressure in chamber 58 rises and when it reaches a predetermined relatively higher value, the pressure switch is again activated to stop motor 34.

As pointed out above, since the fresh filter medium has no filter coating, the coolant passing therethrough and flowing through slot 66 into chamber 60 is incompletely clarified and must therefore be recirculated. This incomplete filtration continues until a sufficient coat of filter cake has been built up on the filter medium. The pressure-responsive switch is so adjusted in relation to the supply of fluid to be filtered that an adequate precoat is built upon the filter medium before it becomes exposed to the vacuum in chamber 58, and thus only completely clarified coolant enters the latter chamber.

At the left end of the conveyor 24 the spent filter medium 42 and associated filter cake 68 are separated from the conveyor and moved downwardly to a separator member 70 which removes the filter cake from the filter medium and guides it to a container 72. The filter medium from which the cake has been removed is collected in a container 74.

Referring now to the lower portion of FIG. 1, the accumulator tank 12 is provided with an internal transverse dam 76 which divides it into a dirty coolant chamber 78 containing a body of dirty coolant to be filtered and a clean filtrate chamber 80 containing a body of clean filtrate. As shown in the drawing, clean filtrate from chamber 80 can flow over dam 76 into chamber 78. Dirty coolant from the work area enters chamber 78 through an inlet 82. Dirty coolant is withdrawn from chamber 78 through a conduit 84 containing a valve 86 and is delivered to the suction of a pump 88 driven by a motor 90. The pump 88 pumps the dirty coolant through a conduit 92 to a distributor 94 which distributes the coolant to be filtered through openings 95 to the pool 46. To limit the height of the liquid in pool 46, an overflow slot 96 is provided through which liquid from the pool can flow to a conduit 97 that extends downwardly into dirty coolant chamber 78.

Clean filtrate from the main vacuum chamber 58 flows through conduit 98 to the chamber 80 and is withdrawn therefrom through a conduit 100 containing a valve 102. The conduit 100 delivers the clean filtrate to the suction of a pump 104 driven by a motor 106 and the filtrate is pumped by pump 104 through a conduit 108 back to the work area for reuse.

Incompletely filtered coolant accumulating in the recirculation chamber 60 flows through a conduit 110 containing a valve 112 to the dirty coolant chamber 78 and is recirculated for further filtration along with the dirty coolant entering chamber 78 through inlet 82.

As indicated above, if the portion of the conveyor 24 supporting the fresh filter medium and the portion of the conveyor having a filter cake built up thereon are subjected to the same relatively low pressure, the volume of incompletely filtered coolant passing through the filter medium and requiring recirculation and refiltering constitutes an excessively high proportion of the dirty coolant coming from the work area and thus significantly reduces the capacity of the filter. In accordance with the present invention the flow rate of this incompletely filtered coolant is reduced by providing the recirculation chamber 60 which is effectively sealed from the main vacuum chamber 58 by the partition 56 and also providing means for establishing within the chamber 60 a pressure that is higher than the pressure in main vacuum chamber 58, thereby reducing the flow rate of the incompletely filtered coolant into chamber 60. This means for establishing a pressure difference between chambers 58 and 60 is most clearly shown in FIG. 2 of the drawing.

Referring to FIG. 2, as well as to FIG. 1, the chamber 60 is connected through side wall 20 of tank 14 with a branch conduit 114 which in turn is connected to a main conduit 116 having a valve 118 therein and an end 120 open to he atmosphere. Conduit 116 is also connected to a branch conduit 122 which contains a valve 124 and communicates through wall 20 of tank 14 with the interior of main vacuum chamber 58. It is evident that when valve 118 is closed and valve 124 is open, chamber 60 will be maintained at the same pressure as chamber 58; whereas when valve 118 is open and valve 124 closed, chamber 60 will be maintained at atmospheric pressure. For intermediate settings of valves 118 and 124 the pressure in chamber 60 will have a value between atmospheric pressure and the relatively low pressure in chamber 58. Thus the valves 118 and 124 with their associated conduits 114, 116 and 122 provide a means whereby the pressure in chamber 60 can be selectively maintained at any desired pressure between atmospheric pressure and the pressure in chamber 58, and the flow rate of incompletely filtered coolant that must be recirculated can be maintained at a desired value.

It is, of course, to be understood that the foregoing description of a preferred embodiment of the invention is intended to be illustrative only. For example, since the liquid level of pool 46 tends to rise as filter cake builds up on the filter medium and tends to fall as fresh filter medium is advanced into the pool, the pressure-responsive switch can be replaced by a float-operated switch responsive to the level of pool 46, and the motor 34 which advances the conveyor can be activated by this float-operated switch. Other modifications that can be made without departing from the scope of the invention as defined in the appended claims will be apparent to those skilled in the art.

We claim:

1. In a filter of the type in which a pool of contaminated liquid to be filtered is formed on a filter medium which is in strip form and is supported on a liquid permeable conveyor that periodically advances the filter medium to supply fresh medium from a source thereof, the underside of the filter medium is exposed to a sealed compartment and vacuum pump means is connected to said compartment to reduce the pressure therein and thereby promote filtration, the improvement which comprises a transverse partition in said compartment which at its top is in sealing engagement with the underside of said conveyor to form separate vacuum chambers in said compartment comprising a first vacuum chamber adjacent to said source of filter medium and communicating with the portion of said conveyor supporting the filter medium entering said pool and a second vacuum chamber connected to said vacuum pump means and remote from said source of filter medium, conduit means connecting said first chamber above the liquid level therein with said second chamber and flow control means operatively associated with said conduit means for maintaining said first chamber at a predetermined and adjustable higher pressure than said second chamber to reduce the liquid flow rate through the portion of the filter medium initially contacting said pool of liquid.

2. A filter according to claim 1 including a conduit effectively connected to said first chamber and having an end open to the atmosphere and valve means in said conduit for adjustably regulating flow of air into said first chamber.

3. A filter as defined in claim 2 including separate valve means for regulating flow of air into said first chamber and for regulating flow of air between said two chambers.

4. A filter as defined in claim 1 wherein said conduit means includes a first conduit connected to said first chamber and having an end open to the atmosphere and a second conduit connecting said second chamber with said first conduit at a point between the open end of said first conduit and said first chamber and said flow control means includes a valve in said first conduit between its open end and its point of connection to said second conduit for regulating air flow to said first chamber and a valve in said second conduit for regulating air flow between said two chambers.

5. A filter having side walls, a liquid permeable endless conveyor, means supporting said conveyor between said side walls, a strip of filter medium mounted on and movable with the top course of said conveyor and cooperating with said side walls to form a pool of liquid to be filtered, means for feeding liquid to be filtered to said pool, means for periodically moving said conveyor to move a fresh portion of said strip of filter medium into said pool, an evacuated compartment underlying the top course of said conveyor and adapted to receive filtered liquid passing through said filter medium, a partition in said compartment which is in sealing engagement at its top with the underside of said conveyor to form separate vacuum chambers in said compartment comprising a first vacuum chamber underlying the portion of said pool into which said filter medium is fed and a second vacuum chamber underlying the remainder of said pool, means for recirculating to said feeding means filtered liquid from said first chamber, vacuum pump means for evacuating said second chamber, a conduit external to said compartment connecting said first and second chambers and valve means in said conduit adjustable to regulate flow of air from said first chamber to said second chamber to maintain said first chamber at a selectively higher pressure than said second chamber and thereby reduce the liquid flow rate through the portion of said filter medium initially contacting said pool.

6. A filter as defined in claim 5 including a conduit effectively connected to said first chamber and having an end open to the atmosphere and valve means in said conduit for adjustably regulating flow of air into said first chamber.

* * * * *